Figure 1:
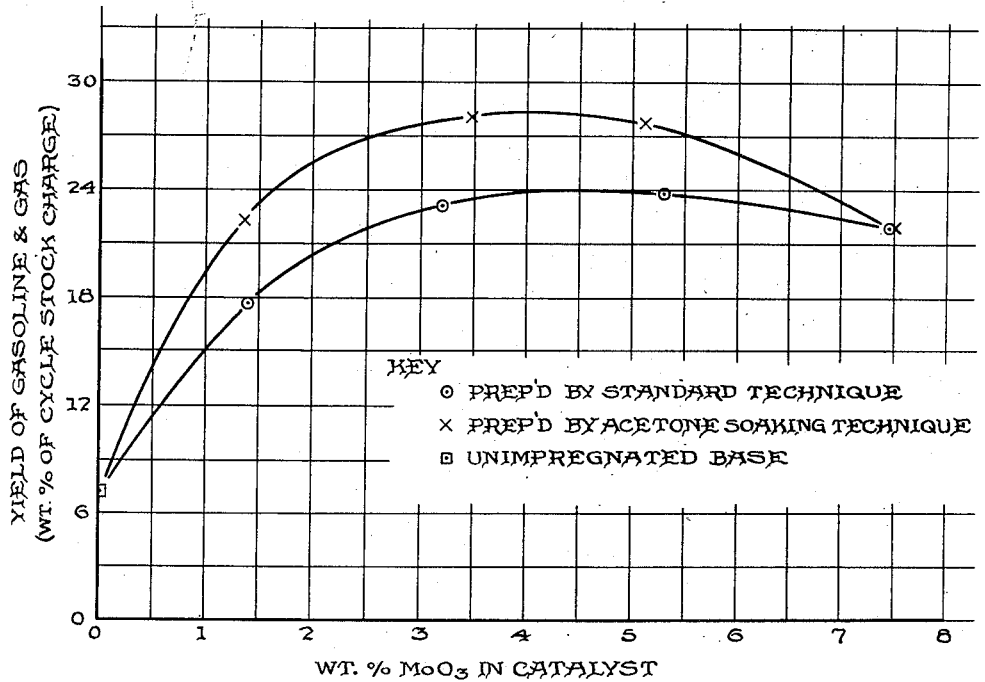

INVENTOR.
JOSEPH B. McKINLEY

INVENTOR.
JOSEPH B. McKINLEY

United States Patent Office 2,783,211
Patented Feb. 26, 1957

2,783,211

METHOD OF PREPARING IMPREGNATED CATALYSTS

Joseph B. McKinley, Pittsburgh, Pa., assignor to Gulf Research & Development Company, Pittsburgh, Pa., a corporation of Delaware Application July 31, 1950, Serial No. 176,828

6 Claims. (Cl. 252—455)

This invention relates to impregnated catalysts and to methods of making and using the same and more particularly to impregnated catalysts which are prepared by physically precipitating an impregnant on a porous catalyst support and to processes for using catalysts so prepared.

The use of catalytic metals in the form of oxides, sulfides, the reduced metal or otherwise is well known in a variety of chemical reactions such as hydrogenation, dehydrogenation, oxidation, polymerization, etc. The catalytic metals may be used alone for such reactions but more frequently they are supported on carrier or support materials having a highly developed porous or capillary structure which materials are selected so as to expose high surface area to the reactants.

The catalysts are used in various forms—pelleted, granular, or fluid, depending on the method of preparation and the type of operation contemplated. The activities of these composited catalysts vary greatly, depending on the mode of preparation which influences the surface structure and the amount of available surface. The common methods of combining the components are coprecipitation and impregnation. The impregnation method is generally preferred because of the ease of manufacture, especially when the support is preformed, and because of the more efficient use of the active metal component which is spread necessarily only on the surface of the support where it is useful while in coprecipitated catalysts, a portion of the active component is unavailable because it is buried under the surface.

To obtain the highest activity for a given supported catalyst, the active component of the catalyst should be distributed as uniformly as possible throughout the support. With coprecipitated catalysts the uniform distribution is usually accomplished automatically during preparation. However, more difficulty is encountered with impregnated catalysts when utilizing either pelleted or powdered supports. The usual method of preparation is to add to the support an aqueous solution of the active metal component in the form of a soluble salt decomposable to its oxide. After adsorption is complete, the excess solution, if any, is filtered off and the impregnated support is dried to remove water and thereafter calcined to decompose the metal salt. Studies have shown that certain portions of catalysts prepared in this manner have high concentrations of impregnant while other portions have practically none. This non-uniformity may be assumed to be caused by a migration of impregnating solution during the drying operation to the preferred sections where evaporation results in the deposition of impregnant.

Various attempts to obtain the advantages of the conventional impregnation technique while avoiding its disadvantages such as the uneven distribution of the impregnant have been made. For example, it is known to agitate wet impregnated catalyst pellets during the drying stage by drying in a rotating cage whereby the migration effect is minimized and a better distribution of the impregnant is obtained. While this method improves the impregnant distribution, the agitation step is an extra expense and causes attrition of the catalyst pellets and therefore should be eliminated if possible. Another example of a prior art attempt to obtain uniform distribution of the impregnant is the multiple impregnation method. In this method the impregnant is added to the base in several treatments with drying and calcining after each treatment. This method of preparation is tedious and expensive.

Still another method for improving the impregnant distribution in impregnated catalysts involves the treatment of the wet impregnated catalyst carrier with a chemical precipitant whereby the catalytic material is chemically precipitated within the pores of the carrier. The disadvantages of this process include the possibility of contamination of the catalyst with the elements of the precipitant and the fact that the catalyic material as precipitated is a different chemical compound from the material which was contained in the impregnating solution.

Accordingly, this invention has as an object to provide an impregnated catalyst in which a uniform distribution of the impregnant on the carrier is obtained. A further object is to provide a highly active impregnated catalyst. A still further object is to provide a relatively simple and inexpensive method for preparing highly active impregnated catalysts. Another object is to provide an improved catalytic process. Still another object is to provide an improved catalytic process for hydrogenating carbonaceous materials. Other objects will appear hereinafter.

These and other objects are accomplished by the following invention which comprises impregnating a porous catalyst carrier with a water solution of a compound of a catalytic metal and treating the impregnated carrier with an at least 50 percent water soluble organic liquid which exerts an anti-solvent effect upon said metal compound to physically precipitate said compound on said carrier.

In the drawings, Figures 1 to 5 are graphs of the results of tests comparing my catalysts with prior art catalysts in the destructive hydrogenation of a petroleum oil.

The impregnated catalysts of this invention are of the type in which the active catalyst component, i. e. the metaliferous impregnant, is deposited by permeating or impregnating the internal surface of the carrier so that its interior channels or pores, when treated, become covered with a fine precipitate. Thus when the specification speaks of the impregnant being "deposited on," "impregnated on" or "distributed on" a carrier, or words of similar import, it is intended to mean such distribution of the impregnant throughout the carrier, on the internal and external surfaces thereof. The metaliferous impregnant in the finished catalyst may be in the form of the reduced metal or of a compound of the metal such as an oxide or sulfide.

My invention is based on a physical precipitation technique for preparing impregnated catalysts. The procedure includes impregnating a porous support with an aqueous solution of the desired impregnant and contacting the wet support thus formed with an organic liquid that will cause the precipitation of the impregnant throughout the support. The contacting with the organic liquid may be by soaking, spraying, or any convenient technique. The precipitation is caused by the anti-solvent effect of the added organic liquid, i. e., the water soluble salt is at least partially insoluble in a mixture of water and the organic liquid in certain proportions and precipitation occurs when a sufficient quantity of the organic liquid is added to the water solution of the salt. No chemical changes occur in the composition of the salt as contrasted with the type of precipitation caused by the addition of a chemical reagent.

The length of time for contacting the wet impregnated catalyst base or carrier with the organic liquid should be sufficient to allow diffusion of the aqueous phase of the impregnating solution into the anti-solvent organic liquid, and the organic liquid into the impregnating solution contained by the base. This will depend upon the particular impregnant and the permeability of the carrier. In general, a period of from ½ to 6 hours is satisfactory when substantially completely water soluble organic liquids are used. However, a shorter or longer time for contacting the impregnated catalyst base with the anti-solvent organic liquid can be used. In general, the length of time for soaking will increase as the water solubility of the organic liquid decreases.

While contacting the impregnated catalyst base with the anti-solvent liquid it may sometimes be desirable to agitate the catalyst. The agitation may aid in keeping the wet catalyst particles in contact with fresh anti-solvent liquid which is undiluted with water. The temperature for contacting the wet impregnated carrier with the anti-solvent liquid is not critical but preferably should be in the range from just above the freezing point of water to below about the boiling point of the organic liquid or water, whichever is lower. A temperature of from about 80° F. to 120° F. is advantageous and convenient.

After contacting the catalyst with the anti-solvent liquid for a sufficient period of time, the catalyst may be drained of unadsorbed liquid as by a short period of vacuum filtration.

The treatment with the organic liquid and the draining step may be advantageously followed by drying. Also it is advantageous to calcine the impregnated catalyst where thermal decomposition of the impregnant into a different form of metaliferous substance is desired. The temperature for drying the treated catalyst carrier preferably should be below the boiling point of the anti-solvent organic liquid. Very high drying temperatures such as about 100° C. above the boiling point of the liquid might cause too rapid boiling of the liquid and displacement of the precipitated impregnant. The calcining step involves heating the catalyst at a temperature sufficient to bring about the desired change. Temperatures high enough to cause fusion of the pores of the carrier should be avoided. Temperatures of from about 800° F. to 1200° F. can be used for converting most impregnant salts to metal oxides. As an alternative to calcining for activating the catalyst, the dried catalyst may be reduced by heating to between about 800° F. and 1200° F. in a stream of hydrogen or a mixture of hydrogen and hydrogen sulfide. This reduction treatment will activate the catalyst. A sulfide catalyst is obtained when hydrogen sulfide is used.

One method of practicing my invention in the preparation of an impregnated catalyst is described in the following example.

EXAMPLE I

A batch of synthetic silica-alumina cracking catalyst pellets was dried in an oven at about 125° C. for about 24 hours and then precalcined in a muffle furnace over a period of about 16 hours consisting of 5 to 7 hours of heat-up and 9 to 11 hours at about 1000° F. A portion of the dried pellets was placed in a round bottom flask and the flask was evacuated for about 30 minutes at pressures below 5 millimeters of mercury. The pores of the catalyst thus freed of air were ready to adsorb the impregnating solution. An aqueous impregnating solution of ammonium molybdate $((NH_4)_2MoO_4)$ was prepared by adding sufficient ammonia to an aqueous solution of ammonium paramolybdate $((NH_4)_6Mo_7O_{24}.4H_2O)$ to form ammonium molybdate. This solution of ammonium molybdate was sucked into the flask in an amount sufficient to cover the catalyst pellets, care being taken to prevent the entrance of air into the flask. After the catalysts were thus contacted with the solution under vacuum for about 5 minutes, the flask was opened to atmospheric pressure for about 10 minutes. Immediately thereafter the unadsorbed solution was removed from the impregnated support by vacuum filtration in a Buchner funnel. The filtration required about 3 minutes and care was exercised not to filter too long to avoid drying the catalyst. The impregnated catalyst pellets were then placed in a jar and 4 volumes of acetone per volume of catalyst were added, the mass was swirled gently for ¼ minute, and then allowed to soak for an hour. Following the soaking period the acetone was filtered off and the pellets were dried in an oven at about 125° C. for 24 hours. Thereafter the dried catalyst pellets were calcined at about 900° F. for about 16 hours including a six-hour heat-up period to convert the impregnant to molybdenum oxide.

The destructive hydrogenation catalyst prepared in the above example displays the high activity which is characteristic of catalysts prepared according to my invention. To demonstrate the superior activity of catalysts made by my method they may be compared for activity with conventionally prepared catalysts in a reaction such as the destructive hydrogenation of a hydrocarbon oil. For this comparison, two series of molybdenum oxide on silica-alumina catalysts were prepared. In the first series were four catalysts prepared by my method and containing different amounts of molybdenum oxide. The second series of catalysts were prepared by the conventional method of preparing impregnated catalysts and also consisted of four catalysts containing different amounts of molybdenum oxide corresponding to the compositions of the catalysts of the first series.

In these two series of four catalysts each, those corresponding members of the two series having about the same molybdenum oxide content were prepared by being impregnated in one batch which was then divided into portions for subsequent treatment to form the members of the comparative series. This procedure insured identical impregnation conditions for all catalysts being compared. All catalysts in both series were prepared using the same stock solution of impregnant. The required concentrations for each impregnation were obtained by diluting measured portions of the stock solution and thus the impregnating solutions differed only in concentration.

After the impregnation, the series of catalysts which were prepared according to my invention as in Example I, were treated with acetone to precipitate the impregnant and dried and calcined exactly according to the procedure of Example I. The series of conventionally prepared catalysts, after the impregnation, were then dried and calcined according to conventional procedure. Thus the conditions of preparation for the series of my type catalysts were identical with Example I and the conditions of preparation for the conventional catalysts were identical with Example I except that the impregnated catalyst pellets were not soaked in acetone but were dried following the impregnation step.

The series of catalysts prepared according to the procedure of Example I and the series of conventional catalysts were tested for their activities in the destructive hydrogenation of a Thermofor Catalytic Cracking cycle stock, the inspection data of which appears in Table I.

*Table I*

INSPECTION OF THERMOFOR CATALYTIC CRACKING LIGHT CYCLE STOCK

| | |
|---|---|
| Sp. gr. at 60°/60° F | 0.8713 |
| Viscosity: | |
|   S. U. S. at 100° F | 36.2 |
|   S. U. S. at 212° F | 5.5 |
| Sulfur, percent | 0.22 |
| Refractive index, $n_D^{20}$ | 1.4929 |
| Aniline pt., ° F | 130.5 |
| Bromine No | 7.2 |
| Molecular wt | 211 |
| Distillation at 10 mm. corrected to 760 mm.: | |
|   I. B. P °F | 314 |
|   10% °F | 442 |
|   50% °F | 525 |
|   90% °F | 601 |

Prior to the test runs, all catalysts were treated with hydrogen at about 900° F. for about 16 hours to reduce the molybdenum trioxide impregnant to molybdenum dioxide which apparently is the catalytically active form.

Figure 4:
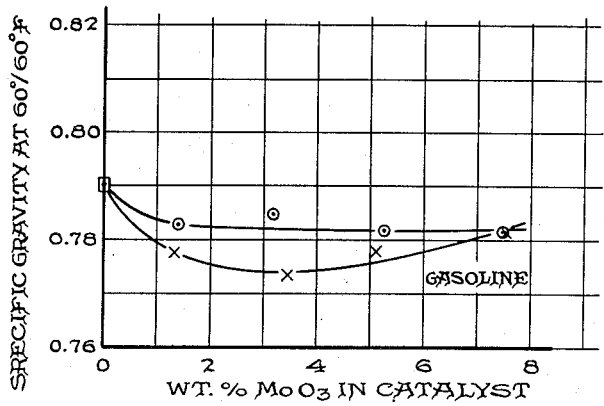

In each test run, the prereduced catalyst without exposure to air was introduced to an 1875 ml. rocking bomb together with 175 grams of the light cycle stock described in Table I. The bomb was evacuated to below one millimeter of mercury and pressured to 900 p. s. i. g. with hydrogen (8.56 gms.). The bomb was heated to 740° for a 64 minute reaction period, then the bomb was cooled and the reaction products were recovered and analyzed. The tests consisted of 9 runs under substantially identical operating conditions but employing a different catalyst in each run. In the first run an unimpregnated precalcined silica-alumina catalyst was used and of the remaining eight runs, four employed the series of my type catalysts and four employed the series of conventional catalysts. The four catalysts prepared according to my process contained 1.37%, 3.49%, 5.13%, and 7.50% MoO3 (runs 3, 5, 7 and 9 respectively) and the four conventional catalysts contained 1.40%, 3.20%, 5.30%, and 7.46% MoO3 (runs 2, 4, 6 and 8 respectively). The results of these tests of the various catalysts are given in Table II.

event the low specific gravity material can in all probability be more easily converted to gasoline as by catalytic cracking than can the heavier residue of the prior art process. Figure 4 shows that the gasoline product obtained when using my catalyst had a lower specific gravity than the gasoline obtained when using the conventional catalysts.

Figure 5:
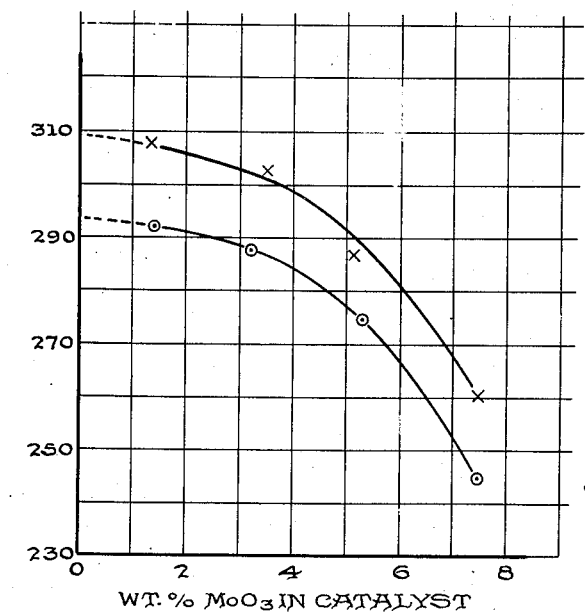

Figure 5 shows throughout the range of compositions tested that my catalyst has a higher surface area than the conventionally prepared catalyst.

Example I describes the use of synthetic silica-alumina catalyst pellets in the preparation of the impregnated catalyst according to my invention. However, other well-known porous carriers may also be used, either as pellets, granules, or in powdered form. The carriers or supports may be inert in a particular reaction or they may influence the reaction, for example, as a silica-alumina carrier promotes cracking in destructive hydrogenation. The suitable carriers may include such materials as natural and synthetic silica and alumina gels, activated carbon, the various synthetic silica-alumina cracking catalysts, etc.

The impregnant employed in Example I was ammonium molybdate, but any suitable water soluble compounds of the catalytic material may be used. Examples of suit-

Table II

| Run No. | Charge stock | 1 | 2 | 3 | 4 | 5 | 6 | 7 | 8 | 9 |
|---|---|---|---|---|---|---|---|---|---|---|
| Charge to bomb: | | | | | | | | | | |
| Catalyst, gms.[1] | | 13.55 | 13.75 | 13.75 | 13.97 | 13.97 | 14.20 | 14.20 | 14.77 | 14.77 |
| Percent MoO3 | | [2] 0 | 1.40 | 1.37 | 3.20 | 3.49 | 5.30 | 5.13 | 7.46 | 7.50 |
| Surface area, m²/gm | | 321.0 | 292.0 | 307.7 | 287.8 | 302.5 | 275.0 | 286.7 | 254.0 | 260.4 |
| Acetone treatment during preparation | | none | none | 1 hr. soak | none | 1 hr. soak | none | 1 hr. soak | none | 1 hr. soak |
| Reaction conditions: Init. press. at temp., p. s. i. g | | 2,135 | 2,065 | 2,025 | 2,025 | 1,995 | 2,005 | 1,975 | 2,000 | 1,980 |
| Products (Wt. percent of cycle stock): | | | | | | | | | | |
| C4+Lighter | | 0.6 | 2.1 | 2.5 | 2.6 | 3.0 | 3.0 | 3.3 | 2.6 | 2.7 |
| Gasoline | 3.4 | 6.6 | 15.5 | 19.9 | 20.5 | 25.0 | 20.8 | 24.3 | 19.1 | 18.9 |
| Residue | 96.6 | 92.8 | 82.4 | 77.6 | 76.9 | 72.0 | 76.2 | 72.4 | 78.3 | 78.4 |
| Hydrogen consumption: Wt. percent of cycle stock | | 0.29 | 0.93 | 1.24 | 1.30 | 1.56 | 1.30 | 1.49 | 1.27 | 1.28 |
| Properties of products: | | | | | | | | | | |
| Gasoline: | | | | | | | | | | |
| Sp. Gr. at 60°/60° F | | 0.7901 | 0.7831 | 0.7775 | 0.7848 | 0.7736 | 0.7818 | 0.7779 | 0.7818 | 0.7818 |
| Wt. percent paraffins+naphthenes | | 78.3 | 76.6 | 80.7 | 77.2 | 83.6 | 77.5 | 83.2 | 76.7 | 83.2 |
| Wt. percent olefins | | 3.2 | 0.6 | 0.2 | 0.2 | 0.2 | 0.3 | 0.2 | 0.4 | 0.2 |
| Wt. percent aromatics | | 18.5 | 22.8 | 19.1 | 22.6 | 16.4 | 22.2 | 16.6 | 22.9 | 16.6 |
| Residue: Sp. Gr. at 60°/60° F | | 0.8735 | 0.8602 | 0.8524 | 0.8504 | 0.8458 | 0.8493 | 0.8448 | 0.8493 | 0.8473 |

[1] Before reduction in a 2,000 space velocity hydrogen stream overnight. Volume is 23.5 cc.
[2] Unimpregnated precalcined base.

Referring to the drawings, Figures 1 through 5 show graphically the results recorded in Table II. In these figures the superior activity of the catalysts prepared according to my invention is clearly evident. For example, in Figure 1 it may be seen that my catalysts are more active in converting to gasoline and gas than the conventional catalysts throughout the range of compositions which were tested except perhaps at the highest weight percent of MoO3 on the catalyst. Moreover, the superior activity of my catalyst is especially pronounced at the optimum value for composition of about 3% impregnant. In all tests the gas formation was substantially constant. Thus, curves similar to Figure 1 can be obtained by plotting data for gasoline yield alone.

Figure 2:
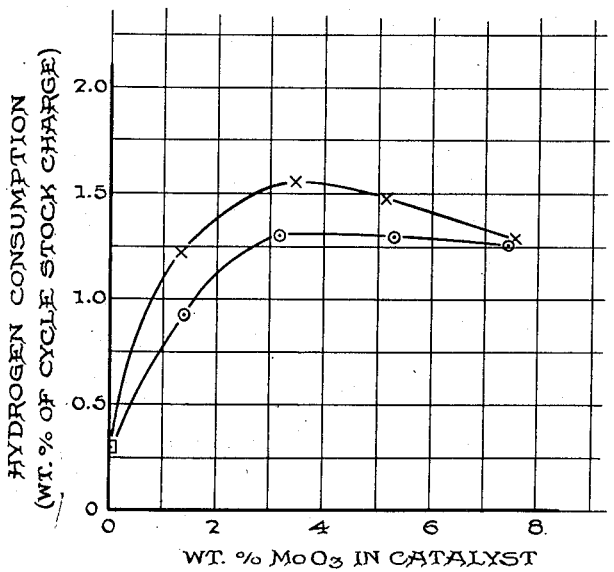

Figure 2 shows that throughout the range of compositions tested, the hydrogen consumption was higher when using my catalysts. Thus my catalysts are shown to have greater hydrogenating activity than the conventional type catalysts.

Figure 3:
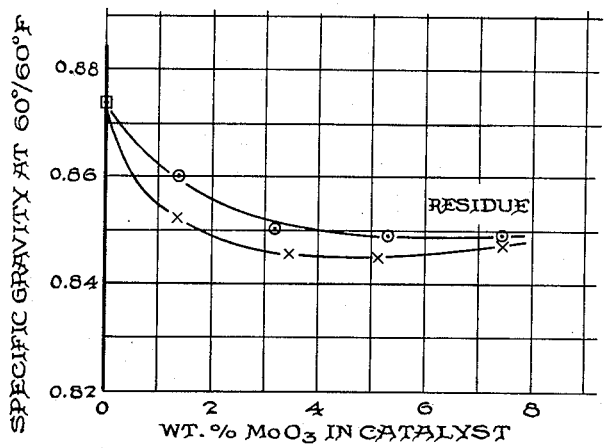

Figures 3 and 4 show the superior results obtained with my catalysts as compared with the conventionally prepared catalysts in regard to the specific gravity of the products. Figure 3 shows that the residue obtained when using my catalyst had a lower specific gravity than when using the conventional catalyst. The low specific gravity of the residue indicates either low average molecular weight or a high degree of saturation or both. In any able compounds are: the acetates, sulfates, ammonium compounds, lactates, and oxalates of any of the conventional catalyst metals such as iron, nickel, cobalt, tungsten, chromium, molybdenum, copper, zinc, mercury, cadmium, aluminum, tin, lead, vanadium, and manganese. However, to be suitable for use in my invention the compound should precipitate upon addition of the organic liquid precipitant without requiring the use of excessive amounts of the organic liquid. When a choice of catalytic metal compounds is available for precipitation it is advantageous to use the one that precipitates at the lowest dilution, i. e., with addition of the smallest amount of organic liquid precipitant. A freshly impregnated catalyst is saturated with solution and it is difficult to get large ratios of the organic liquid into the catalyst. Also compounds which require large dilutions to precipitate them would tend to wash off, especially if they are partially soluble in the organic liquid. For best results, I have found it is preferable not to exceed a dilution of about twenty volumes of organic liquid per volume of adsorbed impregnating solution.

Table III below contains solubility data for a large number of catalytic metal compounds and indicates the proportions of acetone required to precipitate the various compounds from their aqueous solutions. In obtaining the data of Table III, equal-volume increments of acetone were added to a 10 cc. volume of each solution and the dilution at which precipitation of the solid salt first occurred was recorded. From this table the compounds with the most satisfactory solubility characteristics for employment in my invention may be selected when using acetone as the organic liquid precipitant.

The table shows that the nitrates and chlorides are classes of compounds which would require the use of large amounts of acetone to precipitate them from aqueous solutions. Many of these compounds are shown to be completely soluble up to a dilution of acetone in water of 20 to 1. Normally, a dilution of greater than 20 to 1 would be excessive and therefore, such compounds are preferably not used in my process when acetone is used as the precipitant although they may be quite satisfactory when other precipitants are used. Also, many of the nitrates and chlorides may be converted to the ammine salt by the addition of ammonia so that they may be precipitated by the addition of satisfactorily small amounts of acetone. Moreover, even though a particular compound requires addition of large amounts of a particular organic liquid for complete precipitation, the combination may be satisfactory if it is only desired to precipitate a small amount of the compound.

The table shows that the sulfates precipitate at very low dilutions with acetone. After impregnation, these compounds, in general, may be converted to the oxide by reduction in hydrogen to form the sulfide which is then oxidized.

*Table III*

| Periodic table group of cation | Salt used | Sol'n strength, wt. percent oxide | Sol'n temp., °C. | Vol. acetone/ vol. sol'n | Remarks |
|---|---|---|---|---|---|
| I-B—Copper | Cupric Acetate, $Cu(C_2H_3O_2)_2 \cdot H_2O$ | 2.1 CuO | 28 | 3:1 | A.[1] |
| | | 1.1 | 27 | 3:1 | A. |
| | Cupric Chloride, $CuCl_2 \cdot 2H_2O$ | 16 | 24 | >20:1 | B.[2] |
| | Cupric Chromate, $CuCr_2O_7 \cdot 2H_2O$ | 5.3 | Room | 7:1 | A. |
| | | 1.0 | 27 | >20:1 | B. |
| | Cupric Nitrate, $Cu(NO_3)_2 \cdot 3H_2O$ | 20 | 27 | >20:1 | B; Sol'n becomes cloudy. |
| | Cupric Tetramine Nitrate, $Cu(NH_3)_4(NO_3)_2$ | 4–5 | 27 | 1:1 | A. |
| | | 1–2 | 27 | 3:1 | A. |
| | Cupric Sulfate, $CuSO_4 \cdot 5H_2O$ | 8.3 | 30 | 1:1 | C.[3] |
| | | 2.4 | 31 | 1:1 | C. |
| II-B—Zinc | Zinc Acetate, $Zn(C_2H_3O_2)_2$ | 8.7 ZnO | 24 | 4:1 | A. |
| | | 2.6 | 24 | 4:1 | A; Ppt. appears to hydrolyze. |
| | Zinc Chloride, $ZnCl_2$ | 20.2 | Room | >20:1 | B; Slight precipitate formed. |
| | Zinc Nitrate, $Zn(NO_3)_2 \cdot 6H_2O$ | 11.8 | 25 | >20:1 | B. |
| | Zinc Sulfate, $ZnSO_4 \cdot 7H_2O$ | 10.2 | 27 | 4:1 | D[4](1:1). |
| | | 2.5 | 28 | 4:1 | D (1:1). |
| Mercury | Mercuric Acetate, $Hg(C_2H_3O_2)_2$ | 12.5 HgO | 24 | 1:1 | C; Yellow Ppt. |
| | | 2.9 | 24 | 1:1 | C; apparently not mercuric acetate. |
| | Mercuric Nitrate, $Hg(NO_3)_2 \cdot H_2O$ | 16.2[5] | 25 | >20:1 | B; Sol'n becomes cloudy. |
| | Mercuric Cyanide, HgCN | 8.7 | 27 | >20:1 | B. |
| Cadmium | Cadmium Chloride, $CdCl_2$ | 19.9 CdO | 25 | 6:1 | A. |
| | | 8.2 | 24 | 19:1 | A. |
| | Cadmium Sulfate, $CdSO_4$ | 18 | 25 | 6:1 | D(1:1). |
| | | 3.9 | 26 | 8:1 | D(1:1). |
| III-A—Aluminum | Aluminum Nitrate, $Al(NO_3)_3 \cdot 9H_2O$ | 5.2 $Al_2O_3$ | 22 | >20:1 | B. |
| | Aluminum Sulfate, $Al_2(SO_4)_3 \cdot 18H_2O$ | 5.1 | 29 | 4:1 | D(1:1). |
| | | 1.5 | 31 | 5:1 | D(1:1). |
| IV-A—Tin | Stannous Sulfate, $SnSO_4$ | 9.4 SnO | 30 | 1:1 | C. |
| | | 2.1 | 29 | 1:1 | C. |
| Lead | Lead Acetate, $Pb(C_2H_3O_2)_2 \cdot 3H_2O$ | 10.7 PbO[6] | Room | 4:1 | A. |
| | | 5.8 | 28 | 5:1 | A. |
| | | 2.5 | 27 | >20:1 | B; Sol'n becomes cloudy. |
| | Lead Nitrate, $Pb(NO_3)_2$ | 24.3[5] | Room | 1:1 | A. |
| | | 8.3 | 29 | 6:1 | A. |
| | | 3.6 | 28 | >20:1 | B. |
| IV-B—Thorium | Thorium Nitrate, $Th(NO_3)_4 \cdot 4H_2O$ | 16.2 $ThO_2$ | Room | >20:1 | B. |
| V-B—Vanadium | Vanadyl Sulfate, $VOSO_4 \cdot 2H_2O$ | 21 $V_2O_5$ | Room | >20:1 | D (1:1). |
| | | 3.1 | 28 | >20:1 | D (3:1). |
| | Ammonium Metavanadate, $NH_4VO_3$ | 2.9 | Room | 1:1 | A. |
| | | 0.8 | 29 | 3:1 | A. |
| VI-B—Chromium | Chromic Acetate, $Cr_2(C_2H_3O_2)_6 \cdot 2H_2O$ | 8 $Cr_2O_3$ | Room | 5:1 | A. |
| | | 1.3 | 29 | >20:1 | B; Sol'n. becomes cloudy. |
| | Chromic Chloride, $CrCl_3 \cdot 6H_2O$ | 17.5 | Room | >20:1 | B. |
| | Chromic Nitrate, $Cr(NO_3)_3 \cdot 9H_2O$ | 15.1 | Room | >20:1 | B; Sol'n becomes cloudy. |
| | Chromic Sulfate, $Cr_2(SO_4)_3$ | 9 | Room | >20:1 | D (1:1). |
| | Ammonium Dichromate, $(NH_4)_2Cr_2O_7$ | 12.9 | Room | 4:1 | A. |
| | | 3.8 | Room | 11:1 | A. |
| Molybdenum | Ammonium Molybdate, $(NH_4)_2MoO_4$ | 9.5 $MoO_3$ | 26 | 5:1 | D (1:1). |
| | | 3.3 | 26 | 4:1 | A. |
| Tungsten | Ammonium Metatungstate, $(NH_4)_2W_4O_{13}$ | 37.7 $WO_3$ | 24 | 13:1 | D (3:1). |
| | | 14.5 | 27 | 13:1 | D (5:1). |
| | | 3.0 | 25 | about 13:1 | D (9:1). |

See footnotes at end of table.

Table III.—Continued

| Periodic table group of cation | Salt used | Sol'n strength, wt. percent oxide | Sol'n temp., °C. | Vol. acetone/ vol. sol'n | Remarks |
|---|---|---|---|---|---|
| VII-B—Manganese | Manganous Acetate, Mn(C$_2$H$_3$O$_2$)$_2$.4H$_2$O. | 9.8 MnO$_2$ | Room | >20:1 | D (3:1). |
| | | 2.3 | Room | >20:1 | D (7:1). |
| | Manganous Chloride, MnCl$_2$.4H$_2$O. | 18.7 | 28 | >20:1 | D (1:1). |
| | | 4.9 | 28 | >20:1 | B. |
| | Manganous Lactate, Mn(C$_3$H$_5$O$_3$)$_2$.3H$_2$O. | 5.4 | 29 | 2:1 | A. |
| | | 1.5 | 29 | 5:1 | A. |
| | Manganous Sulfate, MnSO$_4$.H$_2$O. | 16.8 | 28 | 5:1 | D (1:1). |
| | | 2.8 | 28 | 9:1 | D (1:1). |
| VIII— Iron | Ferric Chloride, FeCl$_3$.6H$_2$O. | 18.7 Fe$_2$O$_3$ | 27 | >20:1 | B. |
| | Ferric Nitrate, Fe(NO$_3$)$_3$.9H$_2$O. | 14 | Room | 8:1 | A. |
| | | 5 | Room | 11:1 | A. |
| | Ferric Oxalate, Fe$_2$(C$_2$O$_4$)$_3$. | 1.7 | 26 | 1:1 | A. |
| | Ferric Sulfate, Fe$_2$(SO$_4$)$_3$.9H$_2$O. | 5.8 | 27 | 15.1 | D (2:1). |
| | Ferrous Sulfate, FeSO$_4$.7H$_2$O. | 9.2 | 34 | 1:1 | C. |
| | | 1.2 | 30 | 1:1 | C. |
| Cobalt | Cobalt Acetate, Co(C$_2$H$_3$O$_2$)$_2$.4H$_2$O. | 5.1 CoO | Room | 3:1 | A. |
| | | 1.1 | Room | 6:1 | A. |
| | Cobalt Chloride, CoCl$_2$.6H$_2$O. | 13.7 | Room | >20:1 | B (Liquid Layer formed at 1:1; one phase above 12:1). |
| | | 4.2 | Room | >20:1 | B. |
| | Cobalt Nitrate, Co(NO$_3$)$_2$.6H$_2$O. | 20 | Room | >20:1 | B. |
| | Cobalt Sulfate, CoSO$_4$.7H$_2$O. | 10.5 | Room | 1:1 | C. |
| | | 3.1 | Room | 1:1 | C. |
| Nickel | Nickel Acetate, Ni(C$_2$H$_3$O$_2$)$_2$.4H$_2$O. | 5.6 NiO | 27 | 3:1 | A. |
| | | 1.2 | 27 | 5:1 | A. |
| | Nickel Chloride, NiCl$_2$.6H$_2$O. | 17.3 | Room | >20:1 | D (1:1). |
| | | 7.1 | Room | >20:1 | D (4:1). |
| | Nickel Nitrate, Ni(NO$_3$)$_2$.6H$_2$O. | 20 | Room | >20:1 | B. |
| | Nickel Hexammine Nitrate, Ni(NO$_3$)$_2$.6NH$_3$. | 5.1 | 24 | 2:1 | A. |
| | | 2.6 | 24 | 6:1 | A. |
| | Nickel Sulfate, NiSO$_4$.6H$_2$O. | 10 | Room | 2:1 | C. |
| | | 3–4 | Room | 2:1 | C. |

[1] A—Additional volumes of acetone above that recorded in column 5 caused additional precipitation of the salt. In this work the acetone was added in volume increments equal to the volume of the solution being diluted.
[2] B—Salt completely miscible in acetone-water mixture up to the dilution reported in column 5.
[3] C—Precipitation of salt substantially completed at the dilution reported in column 5.
[4] D—A liquid layer containing the salt precipitates at the dilution appearing in column 6 in parentheses. Additional acetone causes crystallization of salt at the dilution reported in column 5.
[5] When making the solution, dilute nitric acid was added dropwise until the precipitate which forms when adding the salt to water just redissolves.
[6] Dilute acetic acid added in the same manner and for the same reason that nitric acid was added as described in note 5.

While acetone was mentioned as a precipitant in the foregoing discussion, any at least 50 percent water soluble organic liquid which forms with water a mixture in which an impregnant compound is at least partially insoluble may be employed. By the language, "at least 50 percent water soluble" which is used in the specification and claims, I intend to define liquids which when mixed with an equal volume of water will dissolve to an extent of at least 50 percent at the temperature of use. However, liquids which are only partially miscible are usually less desirable than those completely miscible because their diffusion into the carrier to replace the aqueous phase is slow due to the slow diffusion across the liquid-liquid interface which is formed. This means that in general a longer soaking time is needed when using organic liquids which are only partially miscible with water. Accordingly, liquids which are completely miscible with water are preferred in my invention.

In my invention it is intended to avoid the disadvantages of the chemical precipitation method of catalyst preparation and therefore the anti-solvent organic liquid should not chemically react with the impregnating salts. Thus the organic liquids can be referred to as "nonreactive organic liquids," meaning that they do not react chemically as used in the invention. Among the suitable liquids are alcohols, aldehydes, and ketones. Specific examples of suitable liquids are methyl alcohol, ethyl alcohol, propyl alcohol, ethylene glycol, 1,4 dioxane, methyl cellosolve, methyl carbitol, acetaldehyde, etc.

In the foregoing discussion it has been pointed out that my invention is applicable to the preparation of catalysts for the destructive hydrogenation of a petroleum oil. In preparing catalysts for such a process, compounds of any of the hydrogenating catalyst metals may be used as the impregnant if they will precipitate when a solution thereof is treated with a suitable antisolvent organic liquid. This particular application of my invention was given merely by way of illustration and it must be understood that catalysts prepared according to my invention are also highly effective in many other catalytic reactions. As pointed out, the catalysts prepared according to my invention are characterized by uniform deposition of impregnant throughout the porous carrier. Thus, the catalyst impregnant is employed more effectively and a highly active catalyst is obtained for any type of reaction which requires the adsorption of a reactant such as hydrogen on a catalytic surface. Thus my invention may be employed to prepare superior catalysts for saturation hydrogenation, dehydrogenation, hydrodesulfurization, and similar processes. In addition, my invention may be employed to prepare highly active catalysts for many other reactions, such as oxidation, chlorination, synthesis, decomposition, polymerization, reduction, cracking, hydration, dehydration, condensation, etc.

What I claim is:

1. The method of preparing a catalyst which comprises impregnating a porous catalyst carrier with a water solution of a compound of a catalyst metal, and treating the impregnated carrier with an at least 50 percent water soluble, organic liquid which is non-reactive with respect to said compound of a catalyst metal and which forms a mixture with the water of said solution in which said metal compound is at least partially insoluble whereby to exert an anti-solvent effect upon said metal compound to physically precipitate said compound on said carrier and drying and calcining the resultant mass.

2. The method of preparing a catalyst which comprises impregnating a porous catalyst carrier with a water solution of a compound of a catalyst metal, treating the wet impregnated carrier with an at least 50 percent water soluble, organic liquid which is non-reactive with respect to said compound of a catalyst metal and which forms a mixture with the water of said solution in which said metal compound is at least partially insoluble whereby to exert an anti-solvent effect upon said metal compound to physically precipitate said compound on said carrier, drying the resulting mass at a temperature below about the boiling point of said organic liquid and calcining the resultant mass.

3. The method of preparing a catalyst which comprises contacting a porous catalyst carrier with a water solution of a compound of a catalyst metal whereby said solution is adsorbed to impregnate said carrier, treating the wet impregnated carrier with a volume less than about twenty times the volume of impregnating solution adsorbed by said carrier of a water soluble, organic liquid which is non-reactive with respect to said compound of a catalyst metal and which forms a mixture with the water of said solution in which said metal compound is at least partially insoluble whereby to exert an anti-solvent effect upon said metal compound to physically precipitate said compound on said carrier, and drying and calcining the resulting mass.

4. The method of preparing a catalyst which comprises contacting a porous catalyst carrier with a water solution of a salt of a catalyst metal whereby said solution is adsorbed to impregnate said carrier, soaking the wet impregnated carrier for a period of from about ½ to 6 hours with a volume less than about twenty times the volume of impregnating solution adsorbed by said carrier of a water soluble, organic liquid which is non-reactive with respect to said salt of a catalyst metal and which forms a mixture with the water of said solution in which said metal salt is at least partially insoluble whereby to exert an anti-solvent effect upon said metal salt to physically precipitate said salt uniformly on said carrier, and drying and calcining the resulting mass.

5. The method of preparing a catalyst which comprises contacting a porous catalyst carrier with a water solution of a compound of a hydrogenating catalyst metal whereby said solution is adsorbed to impregnate said carrier, said compound being at least partially insoluble in an acetone-water mixture and being substantially non-reactive with acetone, treating the wet impregnated carrier with a volume of acetone less than about twenty times the volume of impregnating solution adsorbed by said carrier to precipitate said compound on said carrier, and drying and calcining the resulting mass.

6. The method of preparing a catalyst which comprises contacting a silica-alumina catalyst carrier with a water solution of ammonium molybdate whereby said solution is adsorbed to impregnate said carrier, soaking the wet impregnated carrier with a volume of acetone less than about ten times the volume of impregnating solution adsorbed by said carrier to physically precipitate said ammonium molybdate on said carrier, and drying and calcining the resulting mass.

References Cited in the file of this patent

UNITED STATES PATENTS

| | | |
|---|---|---|
| 1,519,470 | Wilson | Dec. 16, 1924 |
| 2,377,841 | Marshall | June 5, 1945 |
| 2,389,500 | Goshorn | Nov. 20, 1945 |
| 2,510,189 | Nahin et al. | June 6, 1950 |
| 2,554,597 | Starnes et al. | May 29, 1951 |